US009544184B2

(12) United States Patent
Nagasubramaniam et al.

(10) Patent No.: US 9,544,184 B2
(45) Date of Patent: Jan. 10, 2017

(54) SYSTEM AND METHOD FOR TAKING SEQUENCE OF DYNAMIC RECOVERY ACTIONS

(71) Applicant: TECH MAHINDRA LIMITED, Pune (IN)

(72) Inventors: Sankarnarayanan Nagasubramaniam, Pune (IN); Manoj Kotnala, Uttarakhand (IN)

(73) Assignee: TECH Mahindra Ltd., Pune (IN)

( * ) Notice: Subject to any disclaimer, the term of this patent is extended or adjusted under 35 U.S.C. 154(b) by 63 days.

(21) Appl. No.: 14/485,099

(22) Filed: Sep. 12, 2014

(65) Prior Publication Data

US 2015/0082088 A1 Mar. 19, 2015

(51) Int. Cl.
*H04L 12/24* (2006.01)
*G06F 11/14* (2006.01)
*G06F 11/07* (2006.01)

(52) U.S. Cl.
CPC ........... *H04L 41/06* (2013.01); *G06F 11/1402* (2013.01); *G06F 11/0709* (2013.01)

(58) Field of Classification Search
CPC ... G06F 11/1402; G06F 11/14; G06F 11/1425; H04L 41/06; H04Q 3/0075
See application file for complete search history.

(56) References Cited

U.S. PATENT DOCUMENTS

| 2007/0014274 A1* | 1/2007 | Choi | H04W 72/0413 370/349 |
| 2009/0172689 A1* | 7/2009 | Bobak | G06F 9/5061 718/104 |
| 2010/0241711 A1* | 9/2010 | Ansari | G06Q 30/04 709/205 |
| 2012/0244843 A1* | 9/2012 | Dillahunt | H04W 8/18 455/414.1 |
| 2013/0159504 A1* | 6/2013 | Tang | G06F 11/0709 709/224 |

* cited by examiner

*Primary Examiner* — Bryce Bonzo
*Assistant Examiner* — Jonathan Gibson
(74) *Attorney, Agent, or Firm* — Baker Hostetler LLP

(57) ABSTRACT

The present disclosure relates to a system and method for enabling SNMP (Simple Network Management Protocol) based Network Management System to correlate and control sequence of recovery actions to be performed and dynamically change the recovery action sequence across various systems/platforms/devices. Disclosed is a system for taking sequence of dynamic recovery actions in network management system upon occurrence of a fault, in one aspect of the present invention. The system includes an action definition repository containing a sequence of recovery actions for the fault in a particular business scenario. The action definition repository is initialized and updated for every new scenario. The system further includes an action sequence engine being capable of reading the recovery sequence listed in the action definition repository for the fault in the particular business scenario.

8 Claims, 7 Drawing Sheets

Sequence Diagram depicting the aspect of dynamic change in recovery sequence Of the present disclosure

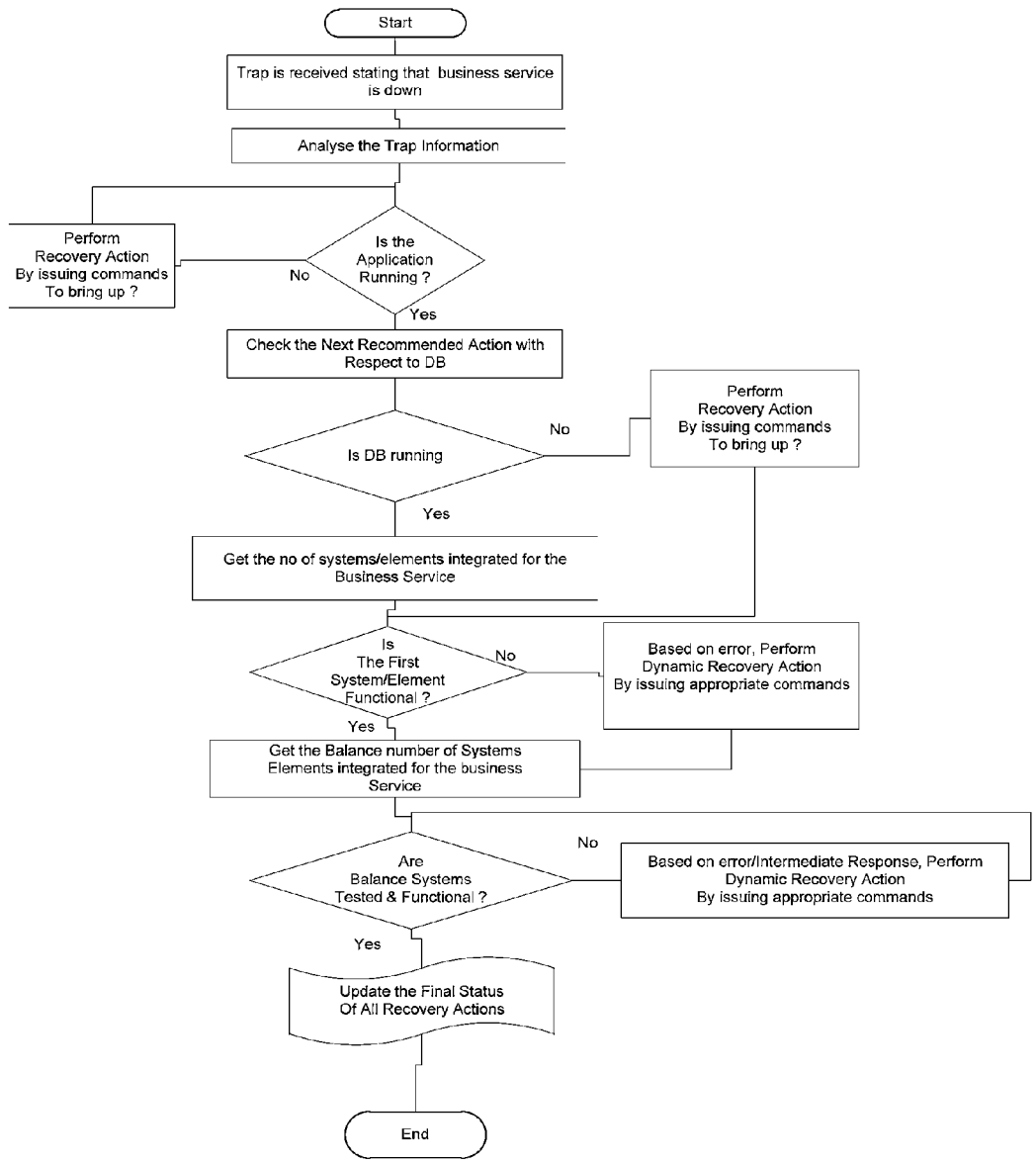
Figure 1: Sample Use Case Flow Chart of the Prior art

| Version | Message ID | Maximum Message Size | Message Flag | Message Security Model | Message Security Parameters | Context Engine ID | Context Name | PDU Type | Request Identifier | Error Status | Error Index | Variable Bindings |
|---------|------------|----------------------|--------------|------------------------|------------------------------|-------------------|--------------|----------|--------------------|--------------|-------------|-------------------|

Figure 2: SET Operation according to the Prior Art

System for taking sequence of dynamic recovery actions, in accordance with the present invention

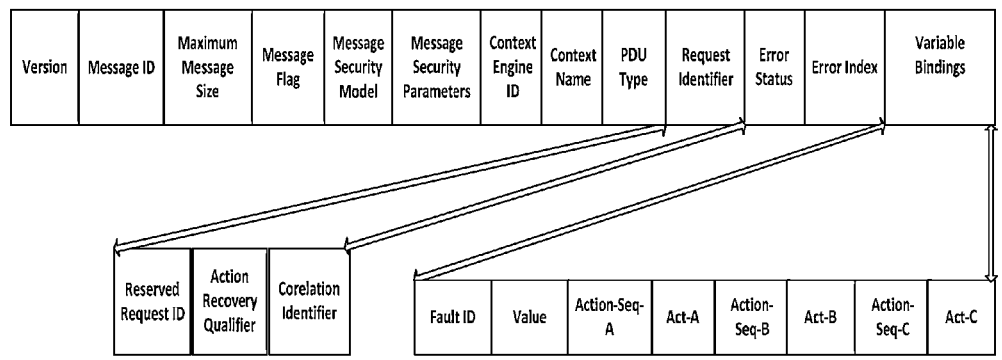
Figure 4 : Enhanced SET Operation according to the present disclosure
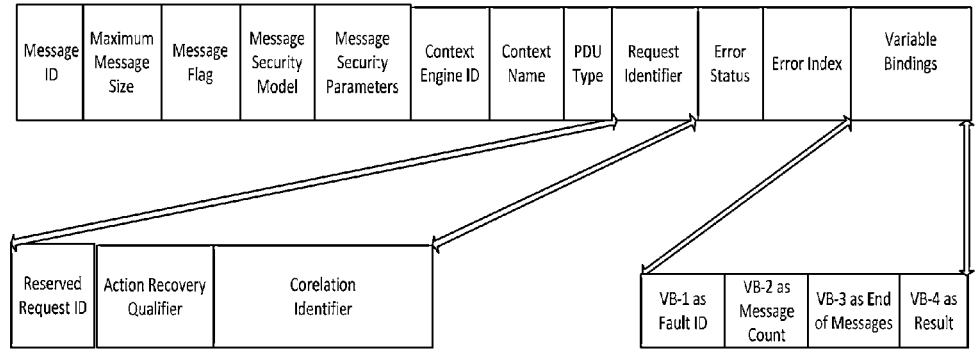
Figure 5: Enhanced INFORM Operation according to present disclosure

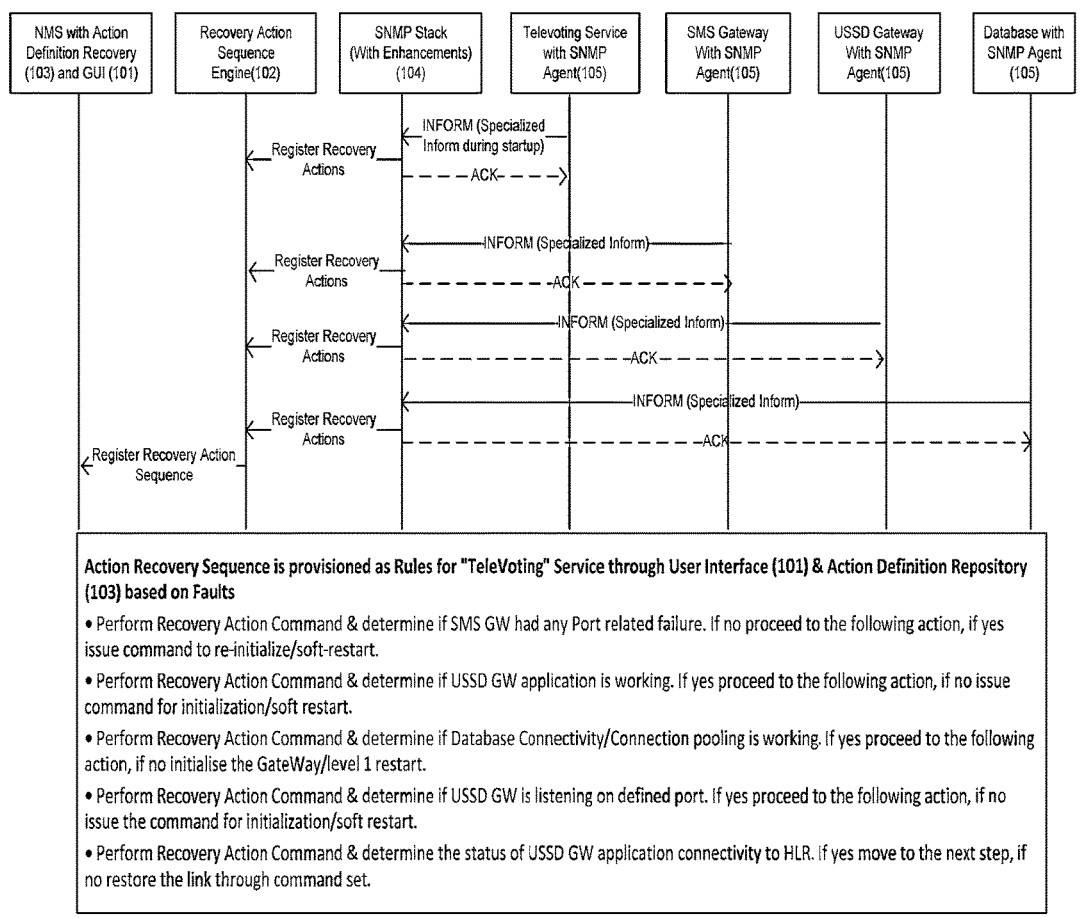
Figure 6: Sequence diagram depicting initialization method of the present disclosure

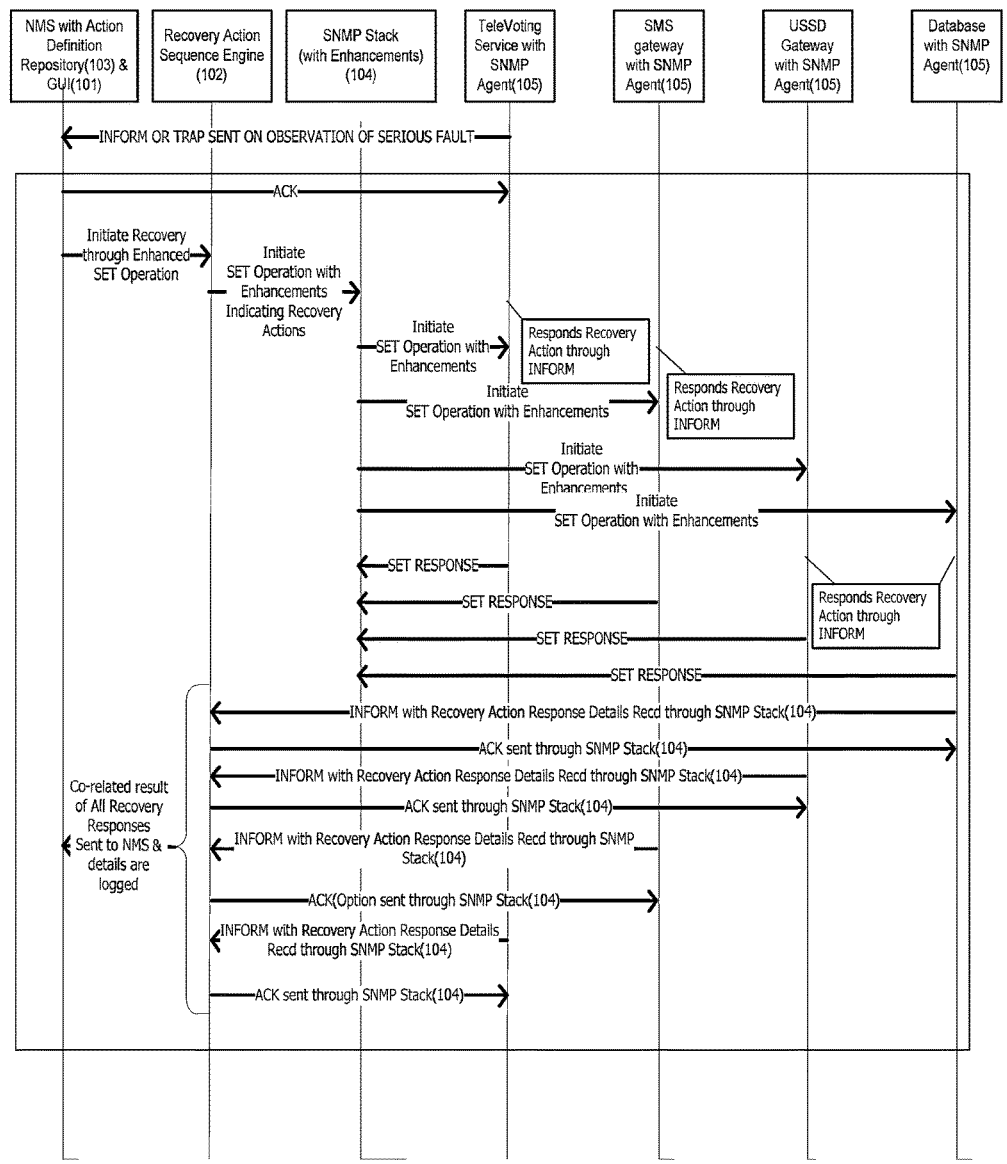
Figure 7: Sequence Diagram depicting method of the present disclosure

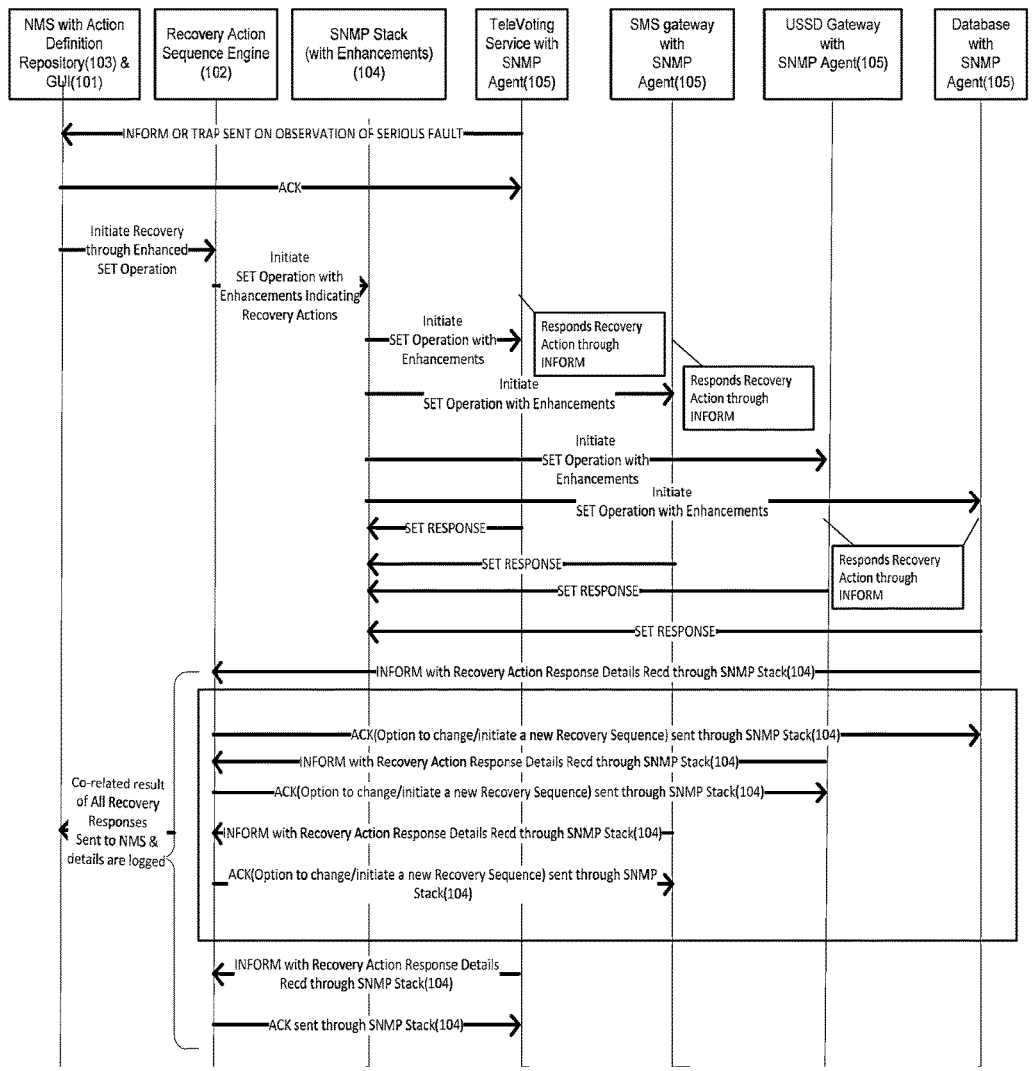
Figure 8: Sequence Diagram depicting the aspect of dynamic change in recovery sequence Of the present disclosure

SYSTEM AND METHOD FOR TAKING SEQUENCE OF DYNAMIC RECOVERY ACTIONS

CROSS-REFERENCE TO RELATED APPLICATIONS

This application claims priority to foreign Indian Patent Application No. 2965/MUM/2013, filed Sep. 13, 2013, the content of which is incorporated herein by reference in its entirety.

FIELD OF THE INVENTION

The present invention relates to the field of Network Management. More particularly the present invention relates to the system and method for enabling network management system to correlate and control sequence of recovery actions to be performed and dynamically change the recovery action sequence across various systems/platforms/devices supporting the SNMP protocol.

DEFINITIONS OF TERMS USED IN THE SPECIFICATION

The expression 'systems' used hereinafter in the specification refers to the systems/platforms/devices.

The expression 'SNMP' used hereinafter in the specification refers to the Simple Network Management Protocol.

The expression 'NMS' used hereinafter in the specification refers to the Network Management System.

The expression 'Provider' used hereinafter in the specification refers to a Telecom/Internet Service Provider or a Network equipment manufacturer.

The expression 'Business Service' used hereinafter in the specification refers to the services offered by any Provider but is not limited to services related to only Telecom/Data Network.

The term OID used hereinafter in the specifications refers to Object Identifier.

The expression HLR/HSS used hereinafter in the specifications refers to Home Location Register/Home Subscriber Server.

The above definitions are in addition to those expressed in the art.

BACKGROUND OF THE INVENTION

A communications network often includes different elements, such as servers, routers, switches and various other elements applicable for both data and voice networks, which perform various functions in the network. In addition, there would be elements not directly related to the communication function of the network may be also connected and available to perform a variety of tasks. These elements often have different management and control interfaces, and use different protocols to communicate.

Network management involves managing and monitoring of network elements. The management of the network elements is done by a system referred as network management system (NMS). The NMS interacts with an agent module running on the respective element for managing them. The NMS interacts with the agent module through a defined set of interfaces, protocols and operations. An example of such interface is Simple Network Management Protocol (SNMP). The SNMP enables retrieving of various important parameters, attributes that are stored in the elements. These parameters, attributes vary at various instance of time based on the operating environment and these variables are referred as "Managed Object". As per SNMP definition, a collection of such managed objects is referred as Management information Base (MIB). The following request-response operations on the managed objects are supported as a part of the SNMP Framework.

GET
GET BULK
GET NEXT
SET

The SNMP Framework also supports notification mechanism through the following operations.

TRAP
INFORM

The GET operations enable fetching of data/value of the managed object. The TRAPS and INFORM protocol data unit (PDU) supports notification mechanism. The TRAP is an asynchronous notification without acknowledgement. However the INFORM based mechanism is an ACK based notification enabled as a part of SNMP V2. The SET operation enables to set a value of the managed object which is typically used for configuring/performing a command instructed by the SNMP manager.

With the proliferation of the network devices, it is envisaged that the number of devices to be managed are growing tremendously. The business service working in such a network environment is typically realized based on a set of functionality that is orchestrated across various systems and platforms in the network. Typically network management has been more focused on the monitoring of elements and the significance of recovery actions for business services in the case of problems/faults has been dealt in a manual manner wherein an administrator tends to login manually across multiple systems and perform the action recovery sequence. Since, the functioning of the business services is most important aspect for a provider offering the service, it is more appropriate to have an automatic/programmatic approach to the recovery of business services as opposed to the common practice of employing manual methods.

Traditionally SNMP has been leveraged largely for network monitoring and more importantly the GET operations are typically used to get the data with TRAPS being used for asynchronous notifications.

The SET operation has been typically used to perform configuration changes and set value of the managed object. Actions resulting out of TRAPS were invariably performed outside the SNMP based elements OR in some cases by defining the OID (Object Identifier) as a part of MIB definition. While this approach has been in practice, there is a fundamental challenge in this approach with respect to taking recovery actions for business services.

In this regard it may be noted that the prior art solutions based on SNMP does not inherently support/have an ability to handle a managed transaction across multiple elements required for performing recovery actions.

As various types of network elements are brought under the NMS, the set of recovery actions required for restoring the business service or fault spans across multiple platforms, systems and devices. Essentially, restoration involves performing multiple set of recovery actions within/across multiple network devices. Besides, the actions could result in intermediate responses from the devices and hence the mechanism to change a course of action sequence in a dynamic manner in a programmatic way by the Management System is important. Accordingly, there exists a need for providing a system and method which is capable of being instructing the recovery actions and correlate outcome of such recovery action responses performed by various agent modules running in the respective platforms/systems/devices.

SUMMARY OF THE INVENTION

Some of the aspects of the present disclosure are aimed to ameliorate one or more problems of the prior art or to at least provide a useful alternative are described herein below:

An aspect of some embodiments of the present disclosure is to dynamically change recovery action sequence based on the feedback received from agent module across various systems/platforms with a view to recover the business service.

Another aspect of the present disclosure is to provide a rule based system for defining the action recovery sequence for the various business service/scenario.

Yet another aspect of the present disclosure is to provide a way for the agent modules to communicate list of supported recovery actions as a part of initialization mechanism.

Still another aspect of the present disclosure is to correlate responses of the intermediate recovery actions in a logical manner.

One more aspect of the present disclosure is to determine the overall status of the recovery action related to the business service which spans across multiple systems/platforms.

Another aspect of the present disclosure is to instruct the platforms/devices that specialized recovery action is being initiated.

Yet another aspect of the present disclosure is to provide ability to change the action sequence dynamically based on the response received based on the feedback received from the systems/platforms.

Still another aspect of the present disclosure is to provide a user interface for configuring the Recovery Action Sequence.

A further aspect of the present disclosure is to facilitate authorized users to configure the Recovery Action Sequence.

Other aspects and advantages of the present invention will be more apparent from the following description when read in conjunction with the accompanying figures, which are not intended to limit the scope of the present invention.

Accordingly, some embodiments of the present invention may provide a system for taking sequence of dynamic recovery actions in network management system upon occurrence of a fault, in one aspect of the present invention. The system includes an action definition repository containing a sequence of recovery actions for the fault in a particular business scenario. The action definition repository is initialized and updated for every new scenario. The system further includes an action sequence engine being capable of reading the recovery sequence listed in the action definition repository for the fault in the particular business scenario. The action sequence engine sends a list of enhanced SET commands to agent module to enable the recovery actions alongside correlating the feedbacks received from the agent module through enhanced INFORM and ACK. The system further includes a user interface module being capable of provisioning results of recovery action.

In some aspects, the action sequence engine sends a list of enhanced SNMP SET commands to agent module to enable the recovery actions alongside correlating the feedbacks received from the agent module through enhanced SNMP INFORM and ACK and also perform course correction based on the intermediate feedbacks received. The system further includes a user interface module being capable of provisioning results of recovery action.

In another aspect, some embodiments of the present invention may provide a method for taking sequence of dynamic recovery actions in network management system upon occurrence of a fault. The method includes referring to an action definition repository of a fault by a network management system, wherein the action definition repository contains a sequence of recovery actions for the fault in a particular business scenario.

Further, the method may include reading by the recovery action sequence engine the recovery action sequence in the action definition repository.

Furthermore, the method may include sending by the recovery action sequence engine, the enhanced SET Operation to the agent module working on the network element, wherein the agents module support the entire operations through INFORM and ACK.

Moreover, the method may include ascertaining by the recovery action sequence engine, the response to all the requests including the intermediate results or initialization messages received through set of INFORM PDU due to the initiation of the action sequence.

Also, the method may include correlating the requests and responses from agent module by the network management system for a particular business scenario before declaring the final result of the recovery action through the user interface module.

Finally, the method includes changing the course of recovery sequence for particular business scenario according to the responses received.

BRIEF DESCRIPTION OF THE DRAWINGS

The present invention provides a system and method for taking sequence of dynamic recovery actions in network management system upon occurrence of a fault. The present invention will now be described with the help of accompanying drawings, in which:

FIG. 1 illustrates a simple use case bringing a typical recovery sequence for a web based business service with a view to also bring out the limitations of the prior art;

FIG. 2 illustrates current protocol data unit (PDU) structure of the SET Operation of the prior art; PDU structure of the INFORM operation is same as that of SET except for the fact that the "PDU TYPE" reflects the INFORM operation;

FIGS. 4 and 5 illustrate suggested enhanced PDU structure of SET and INFORM of the Network Management system for taking sequence of dynamic recovery actions of FIG. 3; and FIGS. 6, 7 and 8 illustrate system of the present invention with a sample use case through a sequence diagram.

DETAILED DESCRIPTION OF THE DRAWINGS

Figure 3:
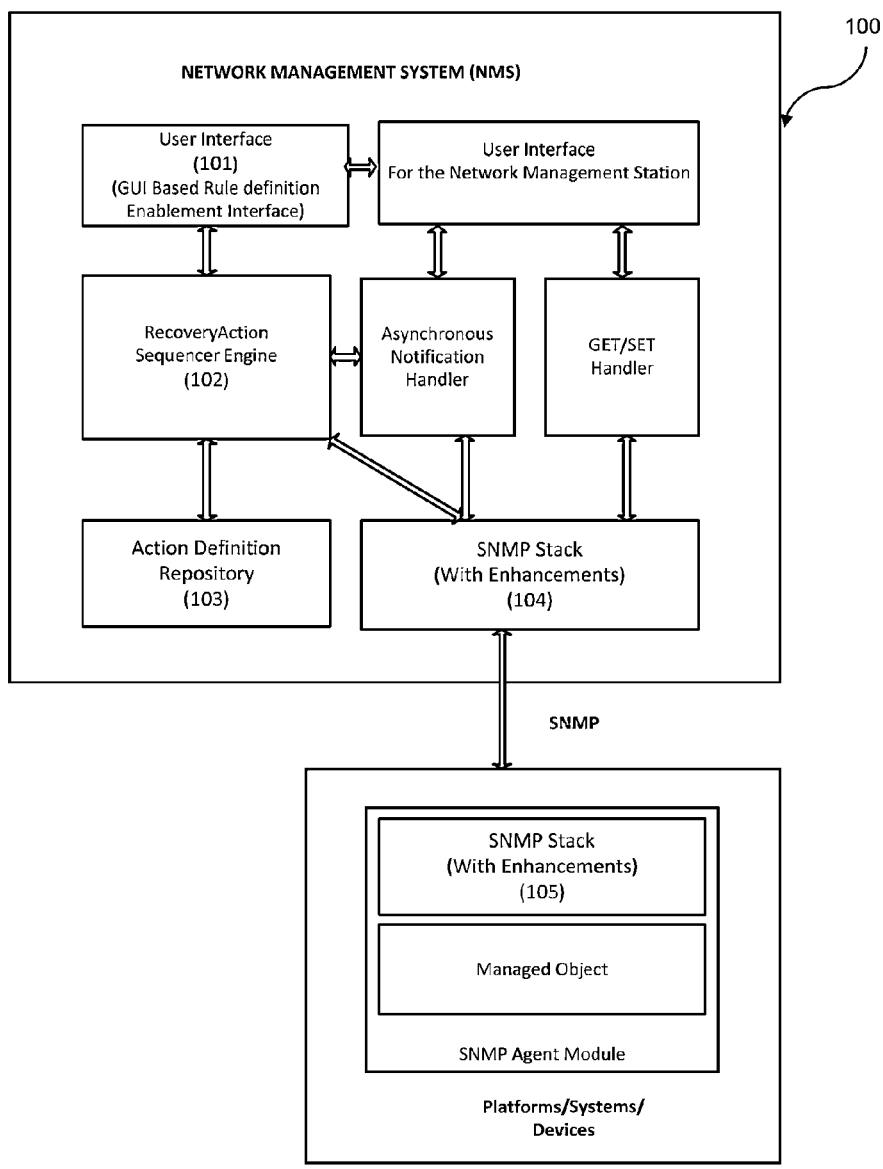
FIG. 3 illustrates system for taking sequence of dynamic recovery actions, in accordance with the present invention.

The foregoing objects of the invention are accomplished and the problems and shortcomings associated with the prior art techniques and approaches are overcome by the present disclosure as described below in the preferred embodiment.

The present disclosure provides system and method for taking sequence of dynamic recovery actions which carry out the recovery actions in an end to end manner with a view to have the business service up and running quickly in the event of faults. The system and method of the present invention assists administrators in effectively performing the recovery of business service in a programmatic manner.

FIG. 1 illustrates a flow chart of a simple use case to explain the recovery actions involved for a simple business service, in accordance with the prior art. Let us consider the following simple use case "say" a SNMP trap is received stating that Web based business service is down. The set of possible recovery actions that could be attempted manually are as follows:

1. Check if application is running. If not then perform the applicable commands manually for recovering the application.

2. If yes, check if database is working, If yes then move to the next logical path. If not then please identify the recovery action required.

3. If yes, check if database connection is Ok. If yes then move to the next logical path. If not then please identify the recovery action required.

4. If database (DB) is functional then check the functional status of each of the elements integrated for the business service.

5. Depending upon the response to step 3 above, Perform the applicable commands manually for each of the system which encountered failure.

6. Based upon response for Steps 1 to 4, it may be interpreted that the action sequence changes dynamically; depending upon the result of the intermediate steps.

7. Besides the correlation of the recovery action for a business service would involve relating the intermediate and multiple responses received from various elements.

As can be interpreted from the above simple use case it can understood that performing these recovery actions would span across multiple elements and the recovery action initiated needs to have a way to manage this transaction and receive multiple intermediate responses for a given request and change the action sequence based on specific response. More importantly, it is evident that the prior art/current specification of SNMP has an inherent limitation to handle a managed transaction including treatment of intermediate responses required for performing end to end recovery actions which is addressed in the current disclosure.

FIG. 2 illustrates the current protocol data unit (PDU) structure of the SET operation, in accordance with the prior art.

Let us say the manual steps for recovery explained as a part of the use case in FIG. 1 is attempted to be carried out using the SNMP Framework. Typically SNMP framework supports the SET operation for an Action/Setting a value to the managed object wherein for each request there is a corresponding response.

As can be interpreted from the simple use case above, specifically for effectively performing recovery action from the NMS, there is a need for:

1. The NMS to be able to specify a recovery action qualifier, correlator identifier for correlating the intermediate responses received from various elements.

2. Ability to dynamically change the recovery action sequence from the NMS by appropriately instructing the agent.

3. Ability to build a list recovery action repository at NMS based on active updates from the agent which can be used for defining the recovery sequence for a given problem.

4. An Action Sequencer Engine at NMS to handle multiple intermediate responses for the recovery action initiated across the network devices/systems/platforms. An example could be for an element to change its Current State from OOS (Out Of Service) to INS (In Service) could mean there are multiple intermediate responses.

Accordingly, there exists a need for providing a system and method which is capable of being instructing the recovery actions and correlate outcome of such recovery action responses performed by various agent modules running in the respective platforms/systems/devices.

Referring now to FIG. 3, there is shown a system (100) for taking sequence of dynamic recovery actions, in accordance with the present invention. The system (100) includes an action definition repository (103), an action sequence engine (102), and an interface module (101), and simple network management protocol (SNMP) stack (104,105).

The action definition repository (103) includes a sequence of recovery actions for the fault in a particular business scenario. Specifically, the action definition repository (103) is initialized and updated for every new scenario. The action definition repository (103) enables the storage of recovery actions and facilitates the configuration of rules for the business service. The action definition repository (103) is configured at network management system (NMS). Each action of the action definition repository (103) is identified by an action qualifier. The list of recovery actions is read by the action sequence engine (102). The action sequence engine (102) is configured within the NMS.

Specifically, the action sequence engine (102) reads the recovery sequence listed in the action definition repository (103) for the fault in the particular business scenario. The action sequence engine (102) sends a list of enhanced SET commands to agent module running on the network elements such as servers, routers, switches and various other elements applicable for both data and voice networks to enable the recovery actions alongside correlating the feedbacks received from the agent module through enhanced INFORM and ACK. This correlation enables capability to dynamically change the course of recovery sequence according to the received feedbacks for the particular business service identified by a particular correlation identifier.

The user interface module (101) is capable of provisioning results of recovery action. The user interface module (101) is in form of a front-ender to declare the final result of recovery action.

The SNMP stack enhancements (104, 105) supports the SNMP enhancements as suggested in FIGS. 4 and 5.

Specifically, enhanced SET operation includes new parameters within 'Request Identifier' field of the protocol data unit (PDU) namely 'Reserved Request ID', 'Action Qualifier' and 'Correlation Identifier' wherein the 'Reserved Request ID' denotes that the operation is a specialized SET operation and falls in the reserved category. The reserved category range is from 102XXXXXXXX-2147483647. Further, the 'Action Qualifier' specifies the list of command categories used for instructing the operations to be performed. Furthermore, the 'Correlation Identifier' contains the identity to correlate all the responses from various elements (hosting the simple network management protocol (SNMP) agent) for a given business scenario. Essentially, the correlation identifier denotes the particular business scenario that needs restoration.

Furthermore, the enhanced INFORM operation includes new parameters within 'Request Identifier' field of the PDU namely 'Reserved Request ID', 'Action Qualifier' and 'Correlation Identifier' wherein 'Reserved Request ID' denotes that the operation is a specialized SET operation and falls in the reserved category. The reserved category range is from 102XXXXXXXX-2147483647. Further, the 'Action Qualifier' specifies the list of command categories used for instructing the operations to be performed. Furthermore, the 'Correlation Identifier' contains the identity to correlate all the responses from various elements (hosting the SNMP agent) for a given business scenario. Essentially the correlation identifier denotes the business scenario that needs restoration.

FIGS. 4 and 5 illustrate the suggested protocol data unit (PDU) structure in accordance with the present invention. Specifically, FIG. 4 illustrates the PDU structure for enhanced SET operation and FIG. 5 illustrates the PDU structure for the enhanced INFORM operation. As shown in FIG. 5, key parameters to inform simple network management protocol (SNMP) manager about the result of action recovery are sent in the Variable Bindings of the "INFORM" PDU.

Specifically, the new parameters within the 'Variable Binding' field of the PDU includes namely VB-1 as 'Fault ID', VB-2 as 'Message Count', VB-3 as 'End of Message', VB-4 as 'Result' where 'Fault ID' denotes the fault identifier for which the concerned action has been initiated, 'Message Count' denotes the number of the message for enabling the sequencing of this action related transaction, 'End of Message' contains "0" OR "1" and "1" denotes that no more messages with respect to this "Correlation Identifier" are expected and 'Result' contains the results of the actions (Success/Failure related details).

In another aspect, the present invention provides a method for taking sequence of dynamic recovery actions in network management system upon occurrence of a fault. The method includes referring to an action definition repository of a fault by a network management system, wherein the action definition repository contains a sequence of recovery actions for the fault in a particular business scenario.

Further, the method includes reading by the recovery action sequence engine the recovery action sequence in the action definition repository.

Furthermore, the method includes sending by the recovery action sequence engine, the enhanced SET Operation to the agent module working on the network device, wherein the agents module support the entire operations through enhanced INFORM and ACK.

Moreover, the method includes ascertaining by the recovery action sequence engine, the response to all the requests including the intermediate results or initialization messages received through set of INFORM protocol data unit (PDU) due to the initiation of the action sequence.

Additionally, the method includes correlating the requests and responses from agent module by the network management system for a particular business scenario before declaring the final result of the recovery action through the user interface module.

Finally, the method includes changing the course of recovery sequence for particular business scenario according to the responses received.

The enhanced SET commands, enhanced INFORM and ACK commands for the method are similar to those described for the system, and hence are not detailed herein again for the sake of brevity of the description.

Referring now to FIG. 7, there is shown work flow of the present invention with the help of an example of tele-voting service.

Typical Recovery action sequence:
The network operator (hosting the unstructured supplementary service data (USSD)/short message service (SMS) Gateway) provides the service to all subscribers.

1. Subscriber sends SMS to a short code with the text: "VOTE".

2. The SMS gateway sends it to the USSD system which picks up the subscriber number.

3. A text-menu with the possible votes options is pushed to the subscribers display.

4. Subscriber makes his choice and pushes the SEND/YES button.

5. The USSD Gateway counts the votes.

6. A "Thank You" message ends the dialogue with subscriber.

The individual elements such as USSD System, SMS Gateway send the following TRAPS to the Network management System (NMS) upon encountering the errors/faults.

The NMS Receives TRAP with Fault ID 6, from the USSD system indicating that "SS7 link is down".

The NMS Receives TRAP with Fault ID 18, from SMS gateway indicating that "TCP Connections are lost".

NMS Receives TRAP with Fault ID 24, Received as "DB failure" from USSD Gateway.

The NMS maps received fault IDs into the potential business scenario by doing a look up at the action definition repository (103) which is already populated at the time of initialization. Business scenario is identified as "Televoting Service not functional". The repository has "Correlation Identifier" as 26 for this scenario.

Based on the "Correlation Identifier", the NMS identifies the following specialized SET operations.

The NMS identifies the "action qualifier 8" as "Restore DB Connection" for the USSD system.

NMS identifies the "action qualifier 103" as "Restore TCP Connection" for the element SMS gateway.

NMS identifies the "action qualifier as 12" "Restore SS7 link" for the USSD system.

The SET operations for the above actions are initiated with "Correlation Identifier" as 26 to both the USSD System and SMS gateway. It may be noted that the SET operation for SMS gateway as "Action qualifier 103" and Action qualifiers 8 and 12 for the USSD system.

The SNMP agent in the SMS gateway responds to the SET operation containing the "Action qualifier 103" by attempting a fresh TCP connection to the SMS gateway. These results in multiple intermediate responses as "INFORM" message indicating the following, INFORM with port details confirming the initiation of the fresh connection is shared by SMSC gateway.

INFORM indicating successful restoration of the new TCP connection is shared by SMSC gateway and also indicating End of Message.

The SNMP agent in the USSD system responds to the SET operation containing the "Action qualifier 8" by attempting to reinitiate the retries on the DB Connections to the database. This result in single/multiple intermediate response as "INFORM" message indicating the following, INFORM indicating successful restoration of the DB connection is shared by the USSD system also indicating End of Message.

The SNMP agent in the USSD system responds to the SET operation containing the "Action qualifier 12" by attempting to reinitiate the SS7 link towards the HLR/HSS. This results in single/multiple intermediate response as "INFORM" message indicating the following, INFORM with SS7 link level confirming the initiation of retries for the SS7 link.

INFORM indicating successful restoration of the SS7 link by the USSD system and also indicating End of Message.

Based on the various INFORM received with from USSD system and SMS Gateway with "Correlation Identifier" as 26, the NMS interprets the results action related to the business scenario.

Dynamic Recovery Action Sequence

In the above example, let us consider that the USSD system responds to the SET operation containing the "Action Qualifier 12" by attempting to reinitiate the SS7 link towards the HLR/HSS and this resulted in a different "INFORM message" as indicated below.

INFORM with SS7 link level confirming the initiation of retries for the SS7 link.

INFORM indicating "Failure" on the restoration of the SS7 link by the USSD system and also indicating End of Message.

Based on this failure, the NMS initiates a dynamic action sequence change by doing a look up and finds out "Action Qualifier 18" needs to be performed on a different element (HLR/HSS) which is connected to the USSD system for restoring the SS7 link.

The SET operation is initiated with "Correlation Identifier" as 26 to the HSS/HLR system. It may be noted that the SET operation for HSS/HLR system contains the "Action qualifier 18".

The SNMP agent in the HSS/HLR system responds to the SET operation containing the "Action qualifier 18" by attempting to reinitiate the SS7 link towards the USSD system. This results in a single/multiple intermediate response as "INFORM" message indicating the following, INFORM with SS7 link level confirming the initiation of retries for the SS7 link, and INFORM indicating successful restoration of the SS7 link by the HLR/HSS system and also indicating End of Message.

Based on the various INFORM received with from USSD system, SMS Gateway and HSS/HLR systems with "Correlation Identifier" as 26 the NMS interprets the results action related to the business scenario and displays the restoration status in the user interface.

FIGS. 6, 7, and 8 illustrate the invention with a sample use case through a set of sequence diagrams. FIG. 6 details the initialization sequence, FIG. 7 details the disclosure related to the recovery of the business service which is described above and FIG. 8 details the key aspect related to the dynamic action change sequence for the recovery of the business service. Specifically, sequence diagram in FIGS. 6, 7 and 8 depict the modules identified in FIG. 5 in the respective sequence diagram to bring out the disclosure in greater details.

Advantages of the Invention

1. System that supports a recovery action sequencer engine as part of the network management system for dynamically controlling the sequence of recovery actions for the business services.

2. System that is focused on improving the fault response and recovery times in an automatic manner for the business service in addition to the traditional coverage on monitoring the platforms, systems and devices.

3. System that provides a flexible way to create a rule based recovery definition.

4. Secure system to invoke the recovery actions in a managed manner.

5. A system that supports a seamless manner to change the dynamic actions received by providing an ability for the elements to send intermediate responses and an ability from the Network management system to initiate a course correction through a programmatic manner.

6. A System that provides a Graphical Interface for rule definition and logging the outcome of recovery actions.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for taking a sequence of dynamic recovery actions leading to recovery of End to End Business Scenarios through an active session based transaction control mechanism by modifying Protocol definitions of Simple Network Management Protocol V1, V2, V3 (SNMP) in a network management system for telecommunication equipment upon occurrence of a fault, the system comprising:

an SNMP instruction set having an enhanced INFORM command with new parameters within a 'Request Identifier' field of INFORM protocol data unit, namely a 'Reserved Request ID', an 'Action Qualifier', and a 'Correlation Identifier' wherein a 'Reserved Request ID' denotes that an operation is a specialized INFORM operation, the 'Action Qualifier' denotes a list of command categories used for instructing the operations to be performed, the 'Correlation Identifier' denotes an identity to correlate all responses from various elements for a given business scenario that needs restoration;

an SNMP instruction set having an enhanced ACK command with new parameters within 'Request Identifier' field of an ACK protocol data unit namely a 'Reserved Request ID', an 'Action Qualifier', a 'Correlation Identifier' wherein the 'Reserved Request ID' denotes that the operation is a specialized ACK operation, the 'Action Qualifier' denotes the list of command categories used for acknowledging or changing operations to be performed, the 'Correlation Identifier' denotes an identity to correlate all responses for a given business scenario that needs restoration; and an SNMP instruction set having an enhanced SET command with new parameters within the 'Request Identifier' field of SET protocol data unit namely the 'Reserved Request ID', the 'Action Qualifier' and the 'Correlation Identifier' wherein the 'Reserved Request ID' denotes that the operation is a specialized SET operation, the 'Action Qualifier' denotes the list of command categories used for instructing the operations to be performed, the 'Correlation Identifier' contains the identity to correlate all the responses from the various elements for the given business scenario that needs restoration;

an action definition repository containing a 'Fault ID', the 'Correlation Identifier', the 'Action Qualifier' and a sequence of recovery actions for the fault in a particular business scenario for Telecom Services, wherein the action definition repository is initialized and updated for every new scenario through asynchronous updates received from an Agent supporting Enhanced Inform Command in Telecom equipment devices;

an action sequence engine configured to read a recovery sequence listed in the action definition repository for the fault in the particular business scenario, wherein the action sequence engine is configured to send a list of enhanced ACK and enhanced SET operations to an agent module supporting the enhanced operations of SNMP to enable the recovery actions alongside correlating a feedback received from the agent module through enhanced INFORM and ACK operations;

and a user interface module configured to chain the recovery sequence for various business scenarios and also share real time updates of the recovery actions in a Graphical manner across diverse set of Telecommunication devices.

2. The system as claimed in claim 1, wherein the faults are functional in nature.

3. The system as claimed in claim 1, wherein the recovery actions are applied to the telecommunication network equipment.

4. The system as claimed in claim 1, wherein the INFORM operation includes additional parameters including a 'Fault ID', a 'Message Count', an 'End of Message' and a 'Result' wherein the 'Fault ID' denotes the fault identifier for which a concerned recovery action has been initiated, the 'Message Count' denotes a number of message for enabling sequencing of transaction, the 'End of Message' denotes that no more messages with respect to the 'Correlation Identifier' are expected, and the 'Result' denotes recovery operation status for each of the recovery actions.

5. A method for taking a sequence of dynamic recovery actions leading to recovery of business scenarios through an active session based transaction control mechanism in a network management system for telecommunication equipment upon occurrence of a fault, the method comprising:

initializing with a network management system an Action definition repository based on asynchronous updates received from Telecommunication devices through enhanced INFORM operation containing Fault ID, Correlation Identifier, an Action qualifier and list of recovery actions for a business scenario;

mapping, with the network management system, received Fault IDs to the business scenarios by doing a look up at the Action Definition repository by identifying a Business scenario with a 'Correlation Identifier';

reading with an action sequence engine the recovery action sequence in the action definition repository;

identifying with the action sequence engine all the business scenarios with the 'Correlation Identifier';

identifying, with the action sequence engine the 'Action Qualifier', a list of command categories used for instructing the operations to be performed at the telecommunication devices;

upon receiving the fault, sending, with the action sequence engine, a series of enhanced SET, ACK commands with a Reserved Request ID to agent modules supporting Enhanced INFORM, SET, ACK Commands running on the telecommunication equipment devices;

receiving with the network management system a series of Enhanced INFORM responses from the agent module with corresponding 'Correlation Identifier';

determining, with the action sequence engine, responses to all requests through Enhanced ACK including intermediate results or initialization messages received through a set of Enhanced INFORM command due to an initiation of the recovery action sequence;

correlating with the action sequence engine the requests and responses from the agent modules for a particular 'Correlation Identifier' before declaring and presenting a final result of the recovery action through a user interface module; and changing with the action sequence engine a course of the recovery sequence dynamically in real time for a particular business scenario according to interim responses received as series of Enhanced Inform and changing the recovery action by modifying the 'Action Qualifier' and sending the same through Enhanced ACK Command.

6. The method as claimed in claim 5, wherein the enhanced SET operation sending parameters 'Reserved Request ID', an 'Action Qualifier' and a 'Correlation Identifier', wherein the 'Reserved Request ID' denotes an operation falling in reserve category range of 102XXXXXXXXX-2147483647 which implies to the agent running in the Telecommunication equipment that it needs to start a recovery process for the fault encountered and has to reply through a series of Enhanced INFORM and Enhanced ACK commands, the 'Action Qualifier' specifying a list of command categories used for instructing operations to be performed, and the Correlation Identifier' stitching together all the responses for a particular business scenario needing restoration.

7. The method as claimed in claim 5, wherein the enhanced INFORM operation fetching parameters include a 'Reserved Request ID', an 'Action Qualifier' and a 'Correlation Identifier', wherein the 'Reserved Request ID' denotes an operation falling in reserve category range of 102XXXXXXXXX-2147483647, the 'Action Qualifier' specifying a list of command categories used for instructing the operations to be performed, and the 'Correlation Identifier' stitching together all the responses for a particular business scenario needing restoration.

8. The method as claimed in claim 5, wherein the enhanced INFORM operation fetching additional parameters include a 'Fault ID', a 'Message Count', an 'End of Message' and a 'Result', wherein the 'Fault ID' denotes a fault identifier for which a concerned recovery action has been initiated, the 'Message Count' denotes a number of messages for enabling a sequencing of a transaction, the 'End of Message' denoting that no more messages with respect to the "Correlation Identifier" are expected, and the 'Result' denotes recovery operation status for each of the recovery actions.

* * * * *